United States Patent
Nguyen et al.

(10) Patent No.: US 11,694,258 B2
(45) Date of Patent: Jul. 4, 2023

(54) SYSTEMS, METHODS, AND DEVICES FOR GENERATING AND TRADING ENVIRONMENTAL CREDITS

(71) Applicant: Terra SP. Z.O.O., Gdynia (PL)

(72) Inventors: Thuy Ngoc Nguyen, Gdynia (PL); Piotr Boleslaw Koszmider, Warsaw (PL)

(73) Assignee: Tergo, LLC, Phoenix, AZ (US)

( * ) Notice: Subject to any disclaimer, the term of this patent is extended or adjusted under 35 U.S.C. 154(b) by 63 days.

(21) Appl. No.: 17/074,354

(22) Filed: Oct. 19, 2020

(65) Prior Publication Data

US 2022/0122172 A1    Apr. 21, 2022

(51) Int. Cl.
*G06Q 30/00* (2023.01)
*G06Q 40/04* (2012.01)
(Continued)

(52) U.S. Cl.
CPC ......... *G06Q 40/04* (2013.01); *G01C 21/3469* (2013.01); *G01C 22/00* (2013.01);
(Continued)

(58) Field of Classification Search
CPC .. G06Q 40/04; G06Q 20/0655; G06Q 20/389; G06Q 20/4014; G06Q 30/018; G06Q 30/0201; G06Q 30/0284; G06Q 50/165; G06Q 50/30; G01C 21/3469; G01C 22/00; G04L 63/08; G04L 63/102
See application file for complete search history.

(56) References Cited

U.S. PATENT DOCUMENTS

2005/0246190 A1   11/2005   Sandor et al.
2009/0210295 A1   8/2009   Edholm et al.
(Continued)

FOREIGN PATENT DOCUMENTS

CA        2735565 A1      10/2011
CN     102334037 A         1/2012
(Continued)

OTHER PUBLICATIONS

Abrishambaf et al., Towards Transactive Energy Systems: An Analysis On Current Trends, https://www.sciencedirect.com/science/article/pii/S2211467X19301105?via%3Dihub, , Energy Strategy Reviews, 2019 (Year: 2019).*
(Continued)

*Primary Examiner* — Crystol Stewart
*Assistant Examiner* — Uche Byrd
(74) *Attorney, Agent, or Firm* — KW Law, LLP

(57) ABSTRACT

Systems and methods of the present disclosure may collect data associated with a user activity. The data may be transmitted from an app running on a computing device with a user account authenticated by the computer-based system. The system may calculate a carbon footprint of the user activity based on the data associated with the user activity. An amount of carbon credits may be assigned to a user account authenticated with the computer-based system based on the calculated carbon footprint of the user activity. A transaction may be written to a blockchain retiring the amount of carbon credits in response to a request to offset a carbon footprint.

20 Claims, 13 Drawing Sheets

(51) Int. Cl.

| | |
|---|---|
| *G06Q 30/0201* | (2023.01) |
| *G06Q 30/018* | (2023.01) |
| *G06Q 20/06* | (2012.01) |
| *G06Q 20/38* | (2012.01) |
| *G06Q 20/40* | (2012.01) |
| *G01C 22/00* | (2006.01) |
| *G06Q 50/16* | (2012.01) |
| *G06Q 30/0283* | (2023.01) |
| *H04L 9/40* | (2022.01) |
| *G01C 21/34* | (2006.01) |
| *G06Q 50/30* | (2012.01) |

(52) U.S. Cl.
CPC ....... *G06Q 20/0655* (2013.01); *G06Q 20/389* (2013.01); *G06Q 20/4014* (2013.01); *G06Q 30/018* (2013.01); *G06Q 30/0201* (2013.01); *G06Q 30/0284* (2013.01); *G06Q 50/165* (2013.01); *G06Q 50/30* (2013.01); *H04L 63/08* (2013.01); *H04L 63/102* (2013.01)

(56) References Cited

U.S. PATENT DOCUMENTS

| | | | |
|---|---|---|---|
| 2011/0184794 A1 | 7/2011 | Rudow et al. | |
| 2011/0208621 A1* | 8/2011 | Feierstein | G06Q 40/04 705/317 |
| 2012/0095897 A1 | 4/2012 | Barrow | |
| 2012/0290652 A1* | 11/2012 | Boskovic | G06Q 10/02 709/204 |
| 2014/0164070 A1 | 6/2014 | Smith | |
| 2015/0122001 A1 | 5/2015 | Shikanai et al. | |
| 2017/0358041 A1* | 12/2017 | Forbes, Jr. | H02J 3/008 |
| 2018/0313797 A1 | 11/2018 | Chokshi et al. | |
| 2020/0160449 A1 | 5/2020 | Bartels et al. | |
| 2020/0284600 A1 | 9/2020 | Oliver Gomila et al. | |

FOREIGN PATENT DOCUMENTS

| | | | |
|---|---|---|---|
| CN | 106408399 A | 2/2017 | |
| CN | 106846128 A | 6/2017 | |
| CN | 107341330 A | 11/2017 | |
| CN | 108226390 A | 6/2018 | |
| CN | 108615192 A | 10/2018 | |
| CN | 108763463 A | 11/2018 | |
| CN | 111340545 A | 6/2020 | |
| CN | 111539722 A | 8/2020 | |
| EP | 3444771 A1 | 2/2019 | |
| JP | 2019175416 A | 10/2019 | |
| JP | 2019101718 A5 | 5/2020 | |
| WO | WO-2008109687 A2 * | 9/2008 | ............. G06Q 10/06 |
| WO | 2019200952 A2 | 10/2019 | |
| WO | 2020176960 A8 | 9/2020 | |

OTHER PUBLICATIONS

Pan et al. Application of Blockchain in Carbon Trading, ScienceDirect, 10th International Conference on Applied Energy (ICAE2018), Aug. 22-25, 2018, Hong Kong, China. Retrieved from https://www.sciencedirect.com/science/article/pii/S1876610219305338#:~:text=In%20corporate%20carbon%20trading%2C%20blockchain,for%20the%20carbon%20trading%20market.

* cited by examiner

SYSTEMS, METHODS, AND DEVICES FOR GENERATING AND TRADING ENVIRONMENTAL CREDITS

FIELD

The present application relates to evaluating carbon footprint to generate and trade credits representing ecologically friendly behavior.

BACKGROUND

Human behavior impact on the environment is sometimes quantified in terms of carbon footprint. An individual's carbon footprint may be described as the amount of carbon dioxide produced by that individual's activities. Individuals can expand or reduce their carbon footprint by making behavioral decisions that increase or reduce carbon dioxide generation directly and indirectly. However, most individuals lack a quantitative sense of how their decisions impact the environment. Even individuals who do understand their ever-changing carbon footprint still might lack a personally meaningful incentive to behave in a more environmentally friendly manner and reduce their carbon footprint.

Corporate behavior is trending towards more socially and environmentally conscientious decisions as investors and the public become more sensitive to social and environmental issues. Companies often seek out environmentally friendly activities and investments that deviate from their core competencies. For example, a datacenter might create solar fields and wind farms generating electricity from alternative fuel sources to offset their electricity consumption. The availability of eco-friendly behaviors for companies remains limited, and companies have little to no way to incentivize or take credit for individual activities.

SUMMARY

Systems, methods, and devices (collectively, the "System") of the present disclosure may include collect data associated with a user activity. The data may be transmitted from an app running on a computing device with a user account authenticated by the computer-based system. The system may calculate a carbon footprint of the user activity based on the data associated with the user activity. An amount of carbon credits may be assigned to a user account authenticated with the computer-based system based on the calculated carbon footprint of the user activity. A transaction may be written to a blockchain allocating the amount of carbon credits to the user account.

In various embodiments, the System may write a transaction to a blockchain transferring a second amount of carbon credits to a second user account authenticated with the computer-based system in response to receiving a purchase from the second user account. The system may also write to the blockchain a transaction retiring the carbon credits assigned to the user account in response to receiving a purchase from the second user account. The user activity may comprise a transportation event, a home improvement event, a food event, a lifestyle event, or a retail event.

In various embodiments, the System may capture a start location and an end location associated with the user activity for inclusion in the data associated with the user activity and a vehicle model associated with the user activity. The System may capture a start time and an end time associated with the user activity for inclusion in the data associated with the user activity. The System may calculate the carbon footprint of the user activity based on a travel distance determined based on the start location and the end location. The amount of carbon credits may be assigned to the user account authenticated with the computer-based system based on a function of the calculated carbon footprint and a baseline value.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

The detailed description of exemplary embodiments herein refers to the accompanying drawings, which show exemplary embodiments by way of illustration and their best mode. While these exemplary embodiments are described in sufficient detail to enable those skilled in the art to practice the inventions, it should be understood that other embodiments may be realized, and that logical and mechanical changes may be made without departing from the spirit and scope of the inventions. The detailed description herein is thus presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Systems, methods, and devices of the present disclosure (collectively, the "System") may operate using a web app, mobile app, tablet, wearable, personal computer, wearable, or other device to upload data relating to the ecological impact of user activities. The System may collect data, analyze, compute and track an individual, products, actions, events, groups and use the data to generate real-time, instantaneous measurement of carbon-dioxide emissions or other suitable measurement for environmental impact. Results may take the form of an instant $CO_2$ emission calculation or an instant $CO_2$ emission saving calculator, for example.

The System may generate credits based on the difference of $CO_2$ emission for actions, products, individuals, or activity relative to a baseline value. For example, a credit may be equivalent to 5,000 kg, 1,000 kg, 500 kg, 100 kg, 50 kg, 10 kg, 5 kg, or 1 kg of $CO_2$ emissions saved relative to the baseline value for an activity, for example. The System may issue fractional credits depending on the credit value of different amounts of $CO_2$ emissions. Each credit may have a unique identifier to enable the eco credit buying, selling, trading, or otherwise transferring a credit between individuals and entities. Companies, individuals, and other entities may thus invest in and otherwise encourage ecologically responsible behavior in individuals by purchasing credits generated by desirable activities.

Figure 1:
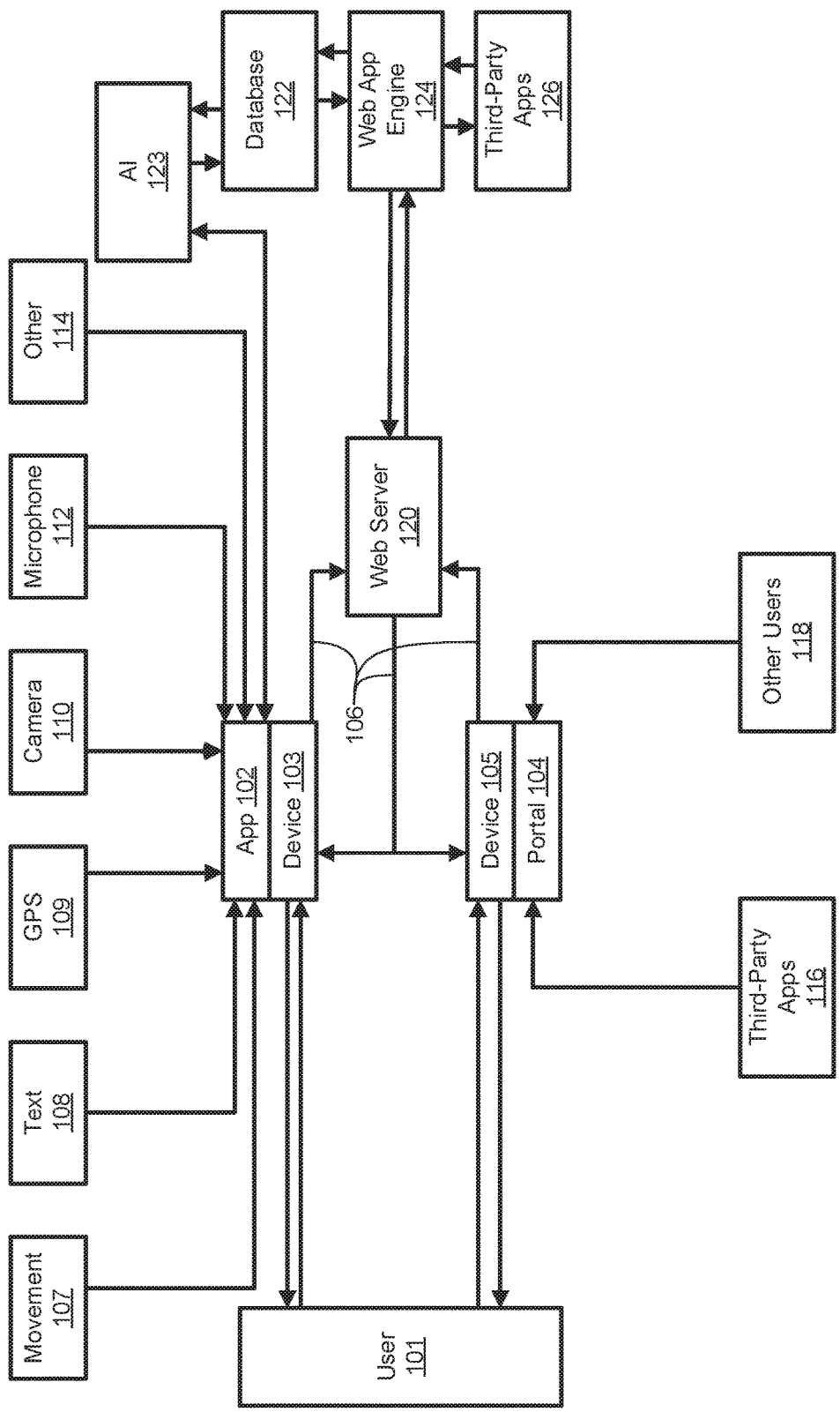
FIG. 1 illustrates a system for generating credits in response to various activities having an ecological impact, in accordance with various embodiments.

Referring now to FIG. 1, an exemplary system 100 is shown for generating credits in response to user data reflecting the ecological impact of various activities, in accordance with various embodiments. User 101 may interact with system 100 through app 102 running on computing device 103 and/or a web portal 104 running on computing device 105. A computing device may include active components that detect the state of the environment surrounding computing device 103 such as, for example, movement sensor 107 (e.g., an accelerometer), a GPS sensor 109, microphone 112, camera 110, biometric scanner, or other component 114 suitable for detecting state. Device 103 may also accept user input in the form of typed text or spoken word using a text interface 108 such as, for example, keyboard, touchscreen, voice-to-text interface, or other suitable input/output device. Third-party apps 116 and other users 118 may also interact with portal 104 to submit or retrieve information related to user behavior and/or environmental credits.

In various embodiments, app 102 may comprise a web app, native app, operating system, website, or other program capable of running on computing device 103. Application 102 and/or other programs running on computing devices may include programs written in a programming language such as, for example, Go, NODE.JS®, JAVA®, KOTLIN®, Solidity, or any other programming language.

In various embodiments, computing devices referenced herein may include a processor and storage component. Computing devices may include or interface with one or more interface devices for input or output such as a keyboard, mouse, track ball, touch pad, touch screen, and/or display. A computing device may also include memory in electronic communication with the processor. A processor may include one or more microprocessors, co-processors, logic devices, and/or the like. A processor may comprise multiple microprocessors may execute in parallel or asynchronously. A logic device may include, for example, analog-to-digital converters, digital-to-analog converters, buffers, multiplexers, clock circuits, or any other peripheral devices required for operation of the processor. Memory may include a single memory device or multiple memory devices and may be volatile memory, non-volatile memory, or a combination thereof.

In various embodiments, a computing device may also comprise a storage interface in electronic communication with the processor. The storage interface may be configured to provide a physical connection to the storage component. For example, in response to a storage component comprising an internal hard drive or solid-state drive, a storage interface may include, for example, appropriate cables, drivers, and the like to enable the physical connection. As a further example, in response to the storage component comprising a removable storage medium, such as a CD-ROM drive, DVD-ROM drive, USB drive, memory card, and the like, the storage interface may comprise an interface, a port, a drive, or the like configured to receive the removable storage medium and any additional hardware and/or software suitable for operating the interface, the port, the drive, or the like.

In various embodiments, a computing device may also comprise a communication interface in electronic communication with the processor. A communication interface may be, for example, a serial communication port, a parallel communication port, an Ethernet communication port, or the like. A computing device may comprise a communication medium configured to enable electronic communication between a computing device and a network 106. A communication medium may include a cable such as an Ethernet cable.

In various embodiments, a communication interface may be configured for wireless communication via infrared, radio frequency (RF), optical, BLUETOOTH®, cellular, or other suitable electromagnetic and/or wireless communication methods. A communication interface may comprise one or more antennas configured to enable communication over free space. A network suitable for passing communication between computing devices may be, for example, an intranet, the Internet, an internet protocol network, or a combination thereof. Each computing device of system 100 may communicate with another computing device either directly or indirectly via the network.

In various embodiments, computing devices of system 100 may be configured to execute an application such as app 102, web server 120, portal 104, web app engine 124, database 122, artificial intelligence 123 (AI), or third-party apps 126, for example, as well as an operating system suitable for operating the computing device. The operating system may manage resources of the computing and provides common services between applications executing on the processor of a computing device. The operating system may be stored on a storage component, within memory, or on a combination thereof. Operating systems may vary between computing devices and may be configured to control the hardware components for the associated computing device.

In various embodiments, computing device 103 and computing device 105 may be in communication with web server 120 over network 106. Web server 120 may serve as the interface for app 102 and/or portal 104 to read and write user data and deliver credit information to user 101 by transmitting data using HTTP across network 106. Web server 120 may be a commonly available web server such as Apache®, for example, running on a dedicated computing device. Web server 120 may also be a hosted web server service such as, for example, Azure® or AWS® running on a cluster of computing devices.

In various embodiments, web server 120 may be in communication with web app engine 124. Web app engine 124 may read and write user data, analytics, and credit information to database 122. Web app engine may also serve and/or receive data from third-party apps 126. Web app engine 124 may process data relating to behavior of user 101 captured by app 102 and/or portal 104 to generate credits based on the environmental impact of various activities performed by user 101.

In various embodiments, AI 123 may interact with database 122 and the app 102. AI 123 may read and write data from database 122 to draw conclusions collected data and recorded outcomes to improve user experience. For example, AI 123 may detect that user 101 is using a bicycle frequently, so AI 123 may prompt in app 102 'Are you going to use a bicycle today?' to both encourage reduction of carbon emission. AI 123 may interact with app 102 by prompting a user with suggestions. For example, AI 123 may detect a user is spending unusually high amounts of time browsing in the app for options. AI 123 may prompt 'How would you like to reduce your carbon emissions?' The AI may thus use 'real-time' data derived from app 102 as an input to improve the experience of user 101 in app 102.

Figure 2:
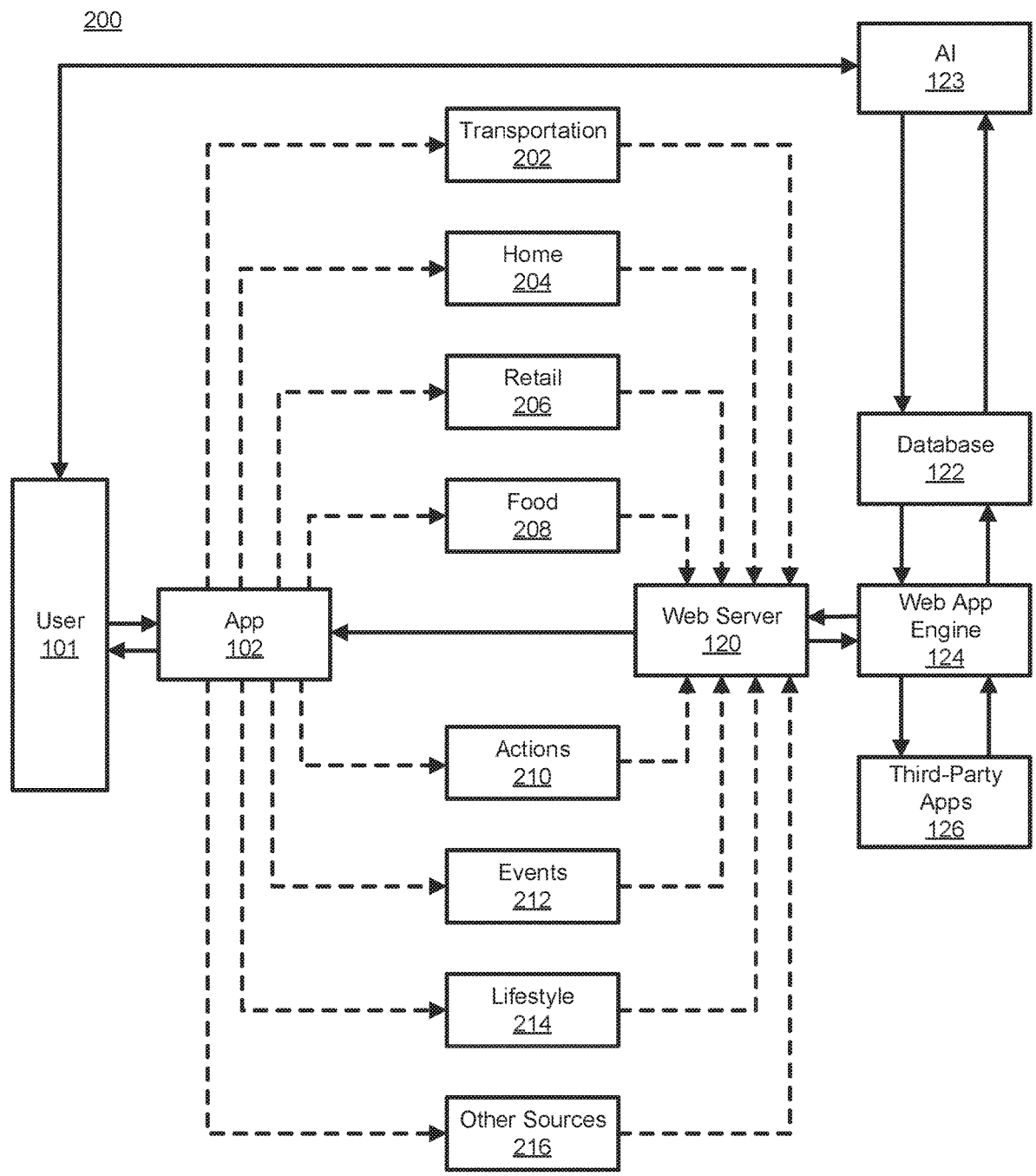
FIG. 2 illustrates a process for capturing data related to activities and creating credits in response to the ecological impact of the activities, in accordance with various embodiments.

Referring now to FIG. 2, a system 200 for generating credits based on the environmental impact of user activities is shown, in accordance with various embodiments. App 102 running on computing device 103 (of FIG. 1) may collect and/or process data related to various activity categories having an environmental impact. For example, app 102 may collect and/or process transportation data 202, home improvement data 204, retail data 206, food data 208, action data 210, event data 212, lifestyle data 214, and/or other data sources 216. App 102 may transmit collected data and/or processing results via web server 120 to web app engine 124. FIGS. 3A to 3I depict examples of processes for app 102 to collect and/or process data related to the foregoing activity categories.

In various embodiments, web app engine 124 may assess the environmental impact of user activities in response to activity data received from app 102 and/or portal 104 to generate credits. Credits may include carbon offset credits or other credits representative of environmental impact. Credits generated by web app engine 124 may include a unique identifier and may be written to an immutable public database such as a blockchain, for example. Credits may be assigned to the user running app 102 or interfacing with portal 104 based on the user account authenticated with system 100 (of FIG. 1) to generate, upload, or otherwise submit the activity data used to generate the credits.

Figure 3A:
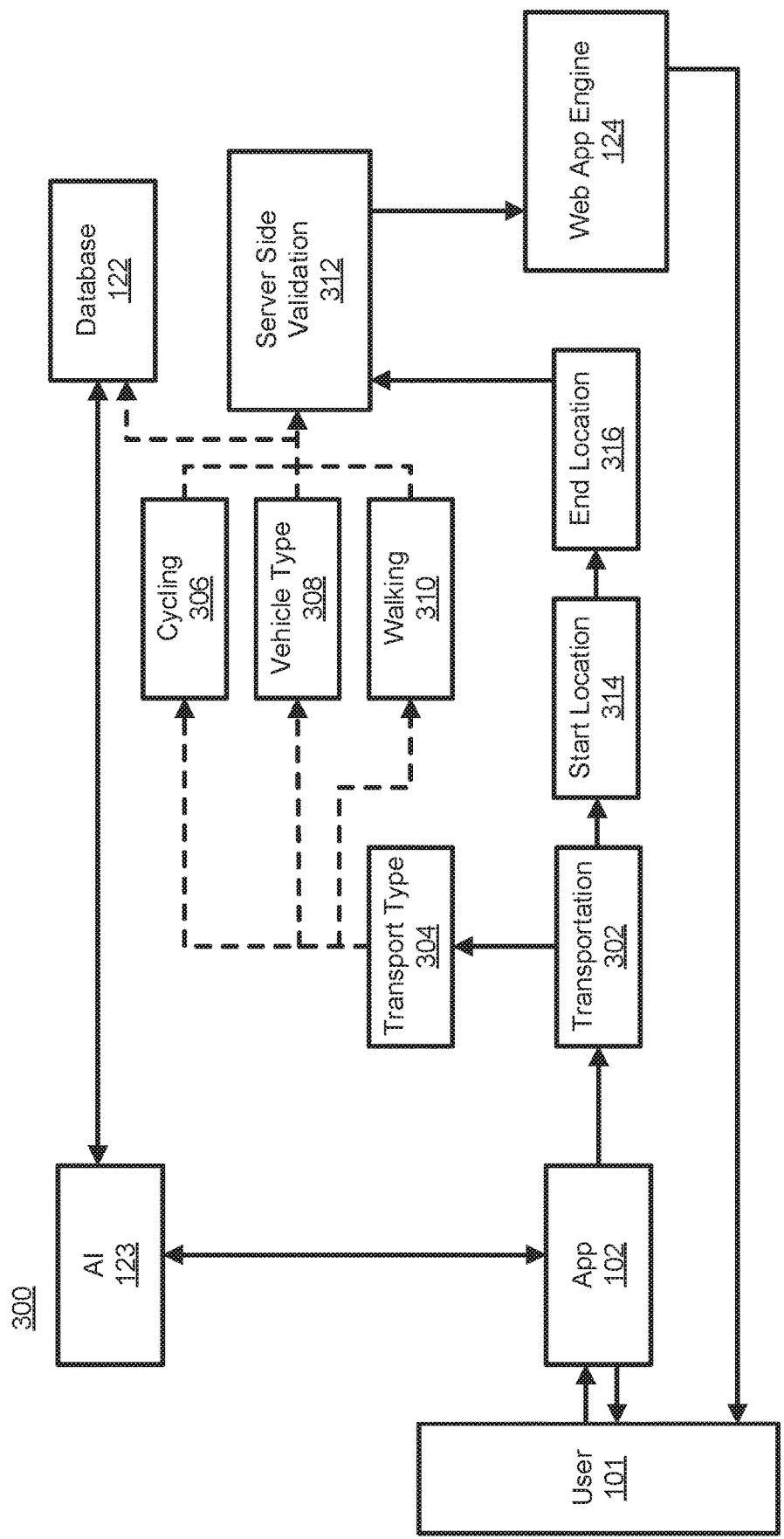
FIG. 3A illustrates a process for capturing data related to transportation activities, in accordance with various embodiments.

Referring now to FIG. 3A, system 300 is shown for collecting and processing transportation data 202 (of FIG. 2) for user 101 using app 102, in accordance with various embodiments. App 102 running on computing device 103 (of FIG. 1) may detect a transportation event 302 in response to a user selecting transportation, detecting a location difference between two GPS inputs, detecting movement of computing device 103 (of FIG. 1), or otherwise determining that user 101 is moving.

In various embodiments, app 102 may categorize the transportation type 304 as cycling 306, auto type 308, walking 310, or other suitable transportation mediums. App 102 may categorize the transportation event 302 in response to the user selecting a category, matching a path of travel and/or rate of travel to a travel type, and/or prompting user 101 to confirm a category of transportation event 302.

In various embodiments, app 102 may transmit the transportation event 302, associated categories, and other associated data such as, for example, distance traveled, duration of travel, and path of travel to web server 120 (of FIG. 2), web app engine 124 (of FIG. 2), and/or database 122 for server-side validation 312 and analysis by AI 123. Server-side validation 312 may include calculating a trip distance and/or trip route using start location 314 and end location 316. Server-side validation 312 may include using a mapping utility that accepts start location 314 and end location 316 to generate a likely route traveled and distance traveled. Server-side validation 312 may also use start location 314 and end location 316 to calculate a straight-line distance between the two points. The distance and/or route traveled along with the categorizations from app 102 may be used by web app engine 124 to calculate credit value in real-time and assign the credits to a user account of user 101 using app 102. AI 123 may consider real-time data from app 102 and data written to database 122 to make user experience improvements.

In various embodiments, system 300 may use various factors and parameters to calculate, estimate, approximate, or otherwise generate $CO_2$ emissions associated with a transportation event to assign a credit value to the transportation event. For example, system 300 may use trip parameters including $CO_2$=$CO_2$ emission (kg), S=speed (km/hr), D=distance (km), and/or T=time (minutes). System 300 may also use factors specific to a given mode of transportation of model of vehicle such as, for example, FS=Speed factor, $FCO_2$=$CO_2$ factor (kg/km), FW=WTT $CO_2$ factor (kg/km), FB=Battery $CO_2$ emission factor (kg/km), FHP=Petrol usage of Hybrid Electric emission factor (kg/km), FHE=Hybrid Electric emission factor (kg/km). Carbon emissions may thus be calculated using equation (1) as follows:

$$CO_2 = T((F_{CO_2} + F_B + F_{HP} + F_{HE})(1 + F_S) + F_W) \quad (1)$$

In that regard, total emission may be calculated based on the duration of emission under certain conditions (e.g., speed, car model etc.) using the foregoing. A trip may comprise various different speeds and thus CO2 emissions rates at various periods between k, where k is a positive integer and we consider a car which moves during the period from the moment $t_i-1$ to the moment $t_i$ at speed $S_i$ for each i varying from 1 to k. The distance covered in each such period is $Di = S_i(t_i - t_{i-1})$ for $1 \le i \le t$. CO2 emissions may be calculated using equation (2) or equation (3) as follows:

$$CO_2 = (F_{CO_2} + F_B + F_{HP} + F_{HE})\left(T + \sum_{i=1}^{k}(t_i - t_{i-1})F_{S_i}\right) + TF_W \quad (2)$$

$$CO_2 = (F_{CO_2} + F_B + F_{HP} + F_{HE})(T + c[T - \cos(T) + 1]) + TF_W \quad (3)$$

Equations (2) and (3) may be multiplied by a constant or function to produce a similar result without deviating from the invention disclosed herein. The foregoing equations are given for exemplary purposes and are not intended to be limiting or exhaustive. The various other types of events disclosed herein may use different equations to model the carbon footprint of such events.

In various embodiments, system 300 may consider cases where the speed is not constant or other factors come into play. Equations 1 and 2 are thus given as simple examples of how system 300 may calculate $CO_2$ emissions for a transportation event 302 and are not intended to be limiting. System 300 may thus use any method for calculating $CO_2$ emissions and may assign a credit value based on the calculated $CO_2$ and other trip characteristics such as duration, model, distance, time, or other factors suitable for determining the positive environmental impact of transportation event 302.

Figure 3B:
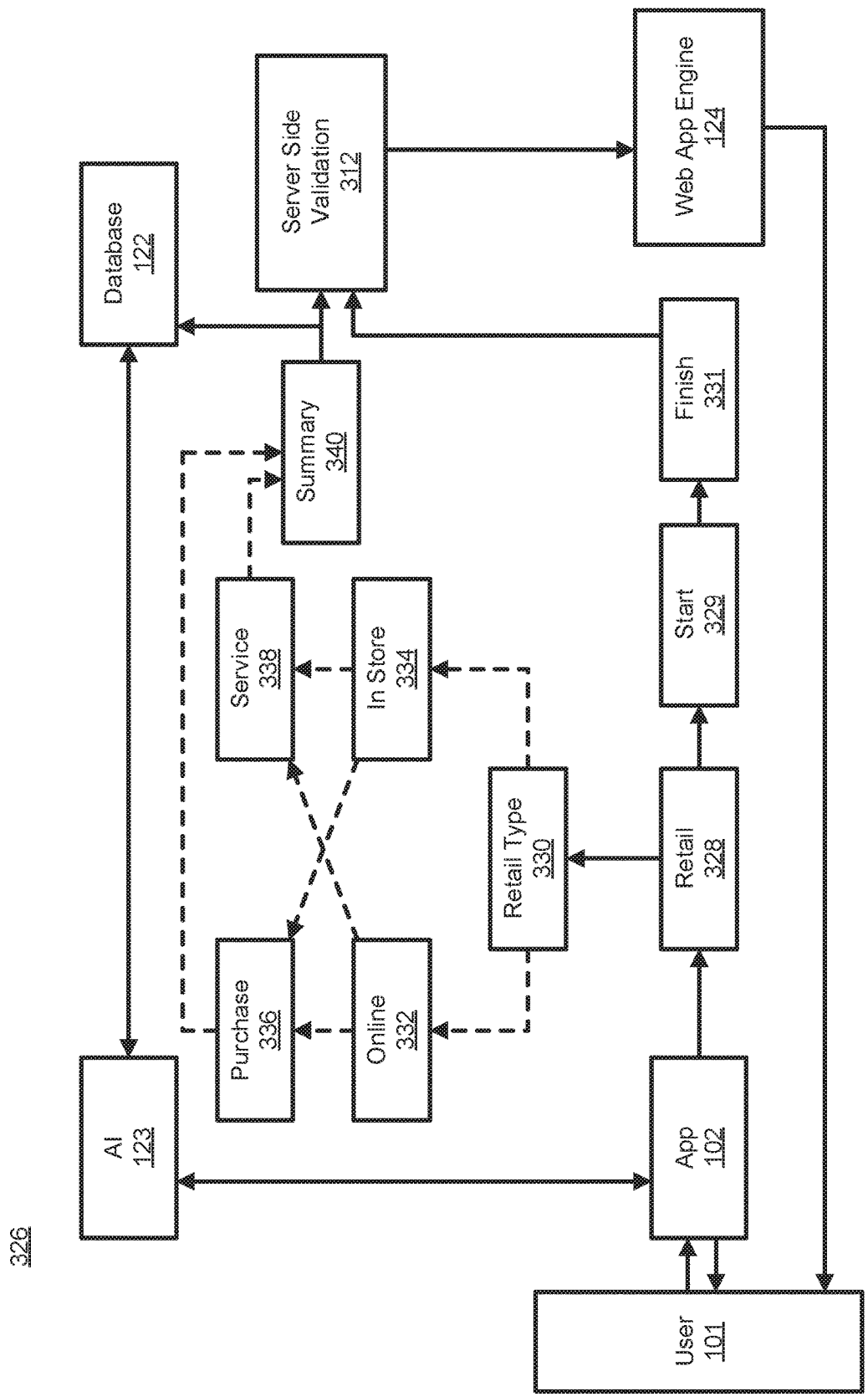
FIG. 3B illustrates a process for capturing data related to retail activities, in accordance with various embodiments.

Referring now to FIG. 3B, system 326 is shown for collecting and processing retail data 206 (of FIG. 2) for user 101 using app 102, in accordance with various embodiments. App 102 running on computing device 103 (of FIG. 1) may detect a retail event 328 in response to a user selecting retail in app 102, a purchase using a virtual card installed on computing device 103, a retail purchase email confirmation accessible to device 103, purchase data from a bank accessible to device 103, or other purchase data communicated to user 101, device 103 (of FIG. 1), and/or app 102 from a bank, retailer, or third-party application. App 102 may use natural language processing, operating system calls, and/or API calls to parse text and retrieve data from other applications running on computing device 103 (of FIG. 1).

In various embodiments, app 102 may categorize retail event 328 as having a retail type 330, which may include, for example, online 332, in store 334, a purchase of goods 336, a purchase of service 338, or other data related to a retail event and relevant to the environmental impact of user 101. Data related to a retail event may include the type of goods or services, the content of goods, the brand of goods or services, the carbon footprint to make and/or deliver goods, carbon footprint over the life of a product, the carbon footprint associated with providing a service, or other data suitable to assess the environmental impact of retail events 328 of user 101. Carbon footprint calculations may consider environmental impact from growing, collecting, or producing raw materials through delivery of an end product. Other factors relevant to carbon footprint may include, for example, the impact of mining oil to produce plastic, the impact of shipping or transportation, the impact if refining processes, the impact of energy consumption, or other environmental externalities accrued over the lifecycle of a product.

In various embodiments, app 102 may capture start 329 data such as, for example, start location, start time, start temperature, start biometrics, or other start conditions measured or entered at the start of retail event 328. App 102 may also capture end 331 data such as, for example, end location, end time, end temperature, end biometrics, or other end conditions measured or entered at the end of retail event 328. Start 329 data may be compared to end 331 data to detect a difference or change in conditions such as, for example, time spent at locations within a retail facility. App 102 may generate a summary 340 of retail event 328 for transmission to web server 120 (of FIG. 2), web app engine 124 (of FIG. 2), and/or database 122 for server-side validation 312 and analysis by AI 123. AI 123 may consider real-time data from app 102 and data written to database 122 to make user experience improvements. Server-side validation may comprise processing data related to retail event 328 to estimate carbon emissions associated with retail event 328. The estimated carbon emissions associated with retail event 328 may be converted into credits assigned to user 101.

Figure 3C:
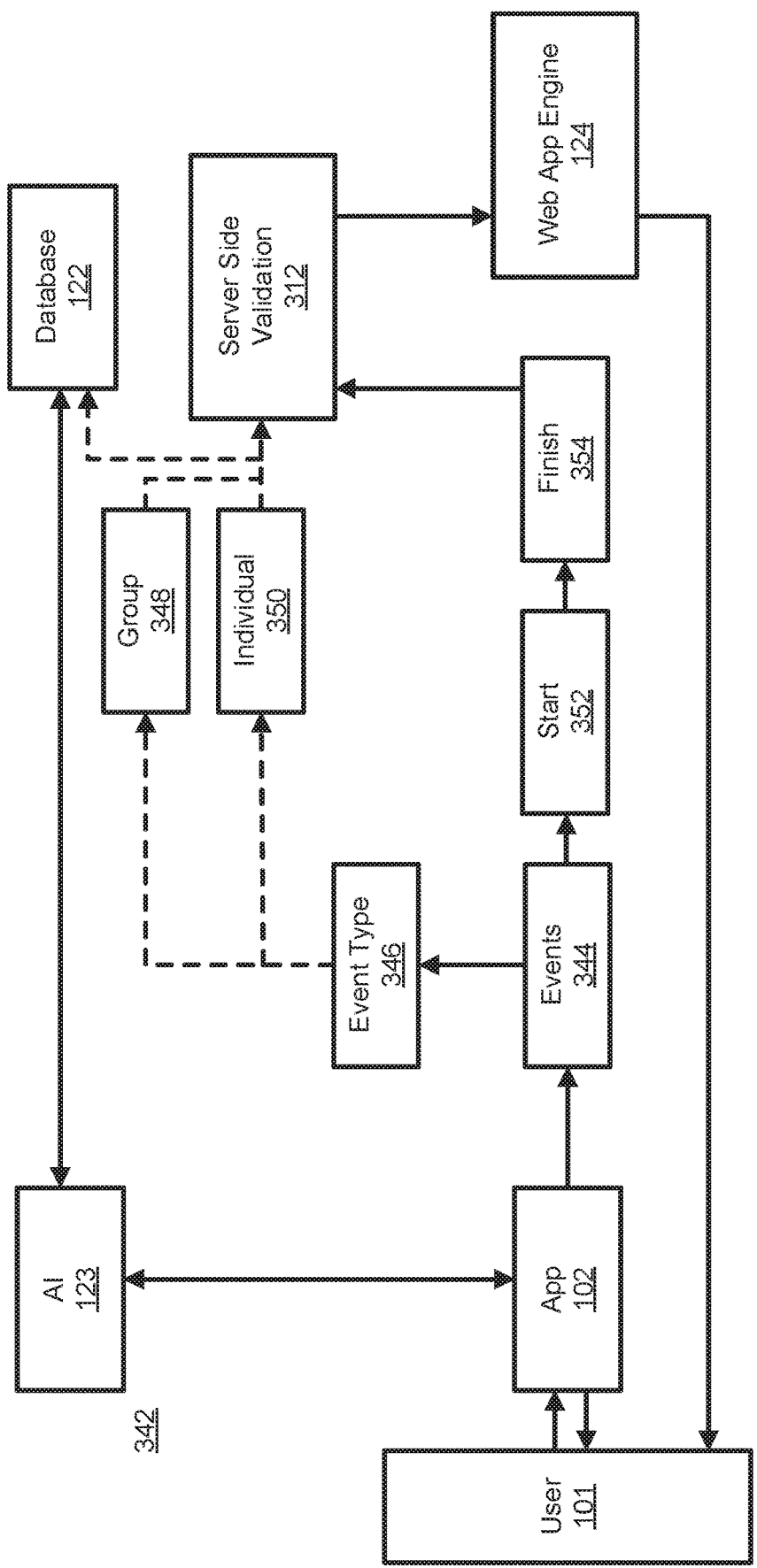
FIG. 3C illustrates a process for capturing data related to event activities, in accordance with various embodiments.

Referring now to FIG. 3C, system 342 is shown for collecting and processing event data 212 (of FIG. 2) for user 101 using app 102, in accordance with various embodiments. App 102 running on computing device 103 (of FIG. 1) may detect event 344 in response to a user selecting event in app 102, an event email confirmation, purchase data from a charge at an event, or other event data communicated to user 101, device 103 (of FIG. 1), data submitted from the event holder, or other data from another application running on device 103 (of FIG. 1). Event 344 may include, for example, planting a tree, a tree consuming $CO_2$ to produce $O_2$, litter pickup, environmental cleaning, recycling, refurbishing devices, or other environmentally friendly events. App 102 may use natural language processing, operating system calls, or API calls, for example, to parse text and otherwise retrieve data from other applications running on computing device 103 (of FIG. 1).

In various embodiments, app 102 may categorize event 344 as having an event type 346, which may include, for example, individual 350 or group 348, or other data related to an event and relevant to the environmental impact of user 101. Data related to an event may include the type of event, the audience in attendance at the event, the carbon footprint to host the event, or other data suitable to assess the environmental impact of user 101 attending event 344.

In various embodiments, app 102 may capture start 352 data such as, for example, start location, start time, start temperature, start biometrics, start environmental condition, or other start conditions measured or entered at the start of event 344. App 102 may also capture end 354 data such as, for example, end location, end time, end temperature, end biometrics, end environmental condition, or other end conditions measured or entered at the end of event 344. Start 352 data may be compared to end 354 data to detect a difference or change in conditions such as, for example, duration, location, or environmental impact of event 344. App 102 may generate a summary 340 of retail event 328 for transmission to web server 120 (of FIG. 2), web app engine 124 (of FIG. 2), and/or database 122 for server-side validation 312 and analysis by AI 123. AI 123 may consider real-time data from app 102 and data written to database 122 to make user experience improvements.

Figure 3D:
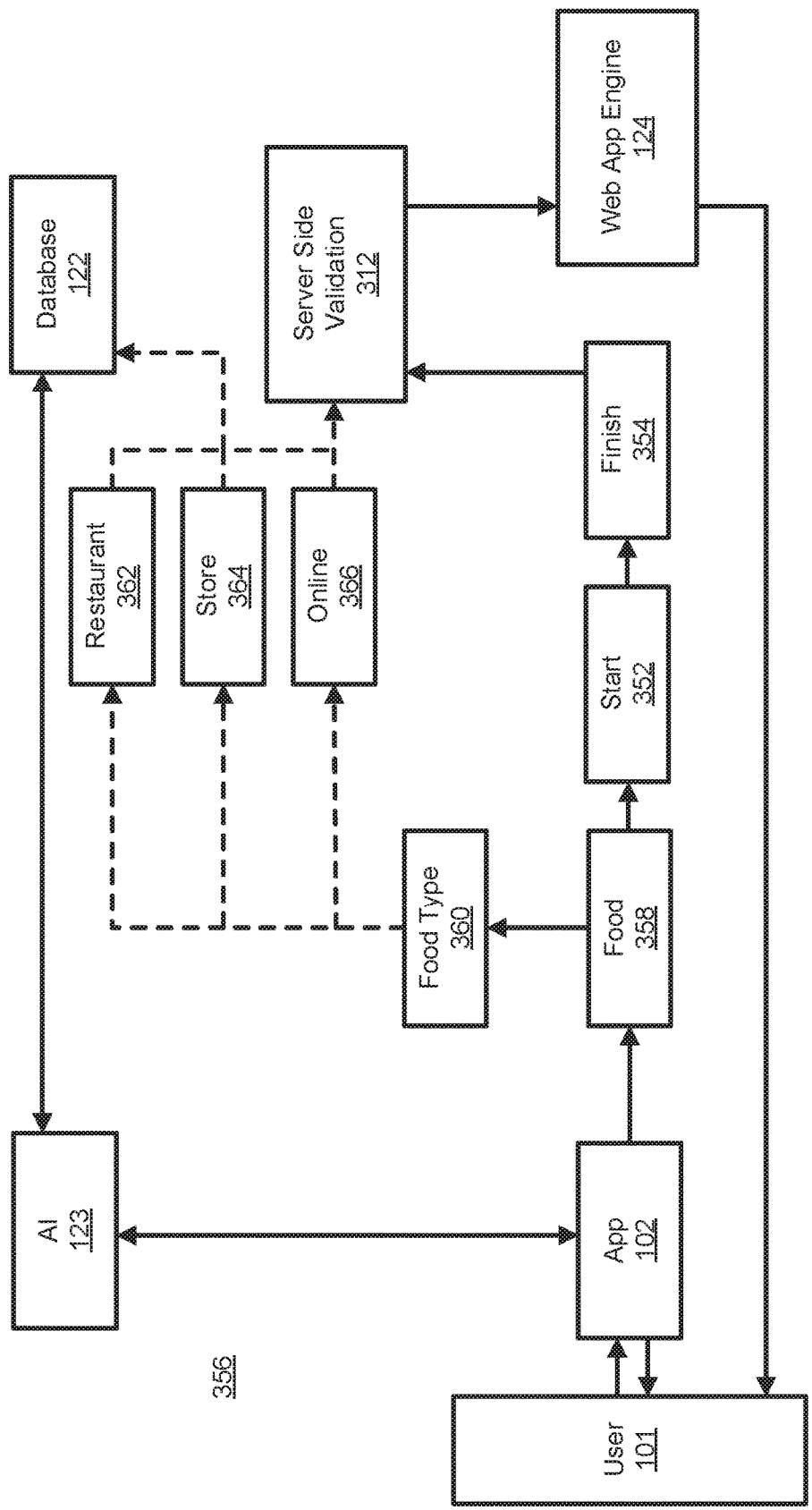
FIG. 3D illustrates a process for capturing data related to food activities, in accordance with various embodiments.

Referring now to FIG. 3D, system 356 is shown for collecting and processing food data 208 (of FIG. 2) for user 101 using app 102, in accordance with various embodiments. App 102 running on computing device 103 (of FIG. 1) may detect a food event 358 (i.e., a meal or food purchase) in response to a user selecting food 358, a food purchase using a virtual card installed on computing device 103 (of FIG. 1), an email receipt for a food purchase, purchase data from bank relating to a food event, or other food-related data communicated to user 101, device 103 (of FIG. 1), and/or app 102 from a food vendor or third-party application running on device 103. App 102 may use natural language processing, operating system calls, or API calls to parse text and extract data from other applications running on computing device 103 (of FIG. 1).

In various embodiments, app 102 may categorize food type 360 of food event 358 as having an associated restaurant 362, physical store 364, online store 366, or other data related to food event 358 and relevant to the environmental impact of user 101. Data related to food event 258 may include the type of food, an environmental rating of the vendor, the carbon footprint to produce and/or deliver the food, or other data suitable to assess the environmental impact of food event 358. Food events 358 may be aggregated to created larger food events spanning a greater period of time to assess food consumption, for example, over daily, weekly, monthly, or annual period. Consumption over daily, weekly, monthly, annual, or other periods can be evaluated for environmental impact and assigned a credit value.

In various embodiments, app 102 may capture start 352 data such as, for example, start location, start time, start temperature, start biometrics, or other start conditions measured or entered at the start of food event 358. App 102 may also capture end 354 data such as, for example, end location, end time, end temperature, end biometrics, or other end conditions measured or entered at the end of food event 358. Start 352 data may be compared to end 354 data to detect a difference or change in conditions such as, for example, an amount of food consumed or purchased over time or a time spent cooking. App 102 may transmit data associated with food event 358 to web server 120 (of FIG. 2), web app engine 124 (of FIG. 2), and/or database 122 for server-side validation 312 and analysis by AI 123. AI 123 may consider real-time data from app 102 and data written to database 122 to make user experience improvements. Web app engine 124 may assign credits to user 101 based on environmental impact of food event 358.

Figure 3E:
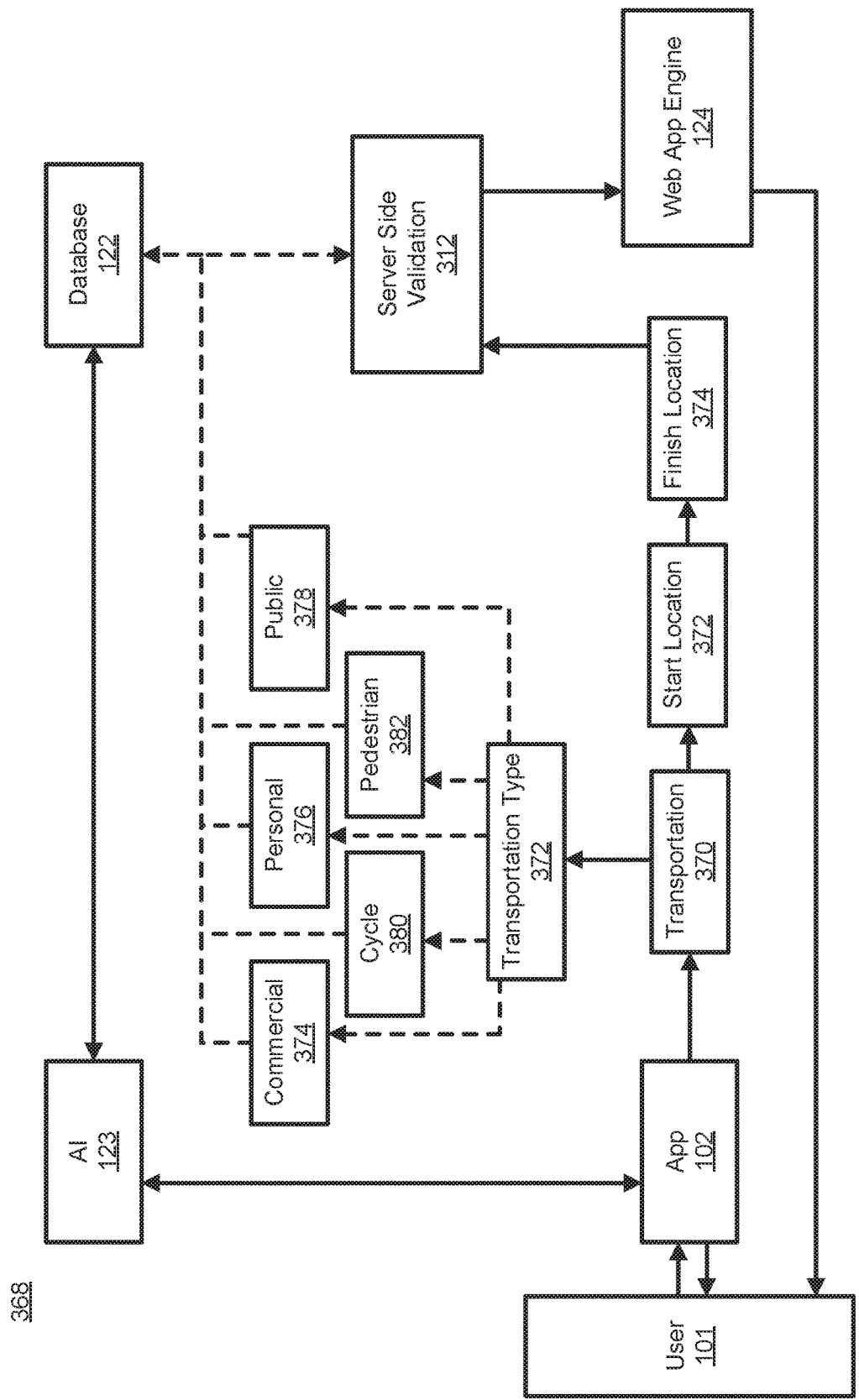
FIG. 3E illustrates a process for capturing data related to transportation activities, in accordance with various embodiments.

Referring now to FIG. 3E, system 368 is shown for collecting and processing transportation data 202 (of FIG. 2) for user 101 using app 102, in accordance with various embodiments. System 368 and system 300 (of FIG. 3A) may be used in tandem, interchangeably, alone, or not at all in various embodiments. App 102 running on computing device 103 (of FIG. 1) may detect a transportation event 370 in response to a user selecting transportation, detecting a location difference between two GPS inputs, detecting movement of computing device 103 (of FIG. 1), or otherwise determining that user 101 is moving. App 102 may categorize the transportation as commercial 374, personal 376, public 378, cycle 380, pedestrian 382, or other suitable transportation categories. App 102 may categorize the transportation event 370 in response to the user selecting a category, matching a path of travel and/or rate of travel to a travel type, and/or prompting user 101 to confirm a category of transportation event 370.

In various embodiments, app 102 may transmit the transportation event 302, associated categories, and other associated data such as, for example, distance traveled, duration of travel, and path of travel to web server 120 (of FIG. 2), web app engine 124 (of FIG. 2), and/or database 122 for server-side validation 312 and analysis by AI 123. AI 123 may consider real-time data from app 102 and data written to database 122 to make user experience improvements. Server-side validation 312 may perform quality assurance checks. Web app engine 124 may calculate a trip distance and/or trip route using start location 372 and finish location 373. Web app engine 124 may use a mapping utility that accepts start location 372 and finish location 373 to generate a likely route traveled and distance traveled. Web app engine 124 may also use start location 314 and end location 316 to calculate a straight-line distance between the two points. The distance and/or route traveled along with the categorizations from app 102 may be used by web app engine 124 to calculate credit value in real-time and assign the credits to a user account of user 101 using app 102.

Figure 3F:
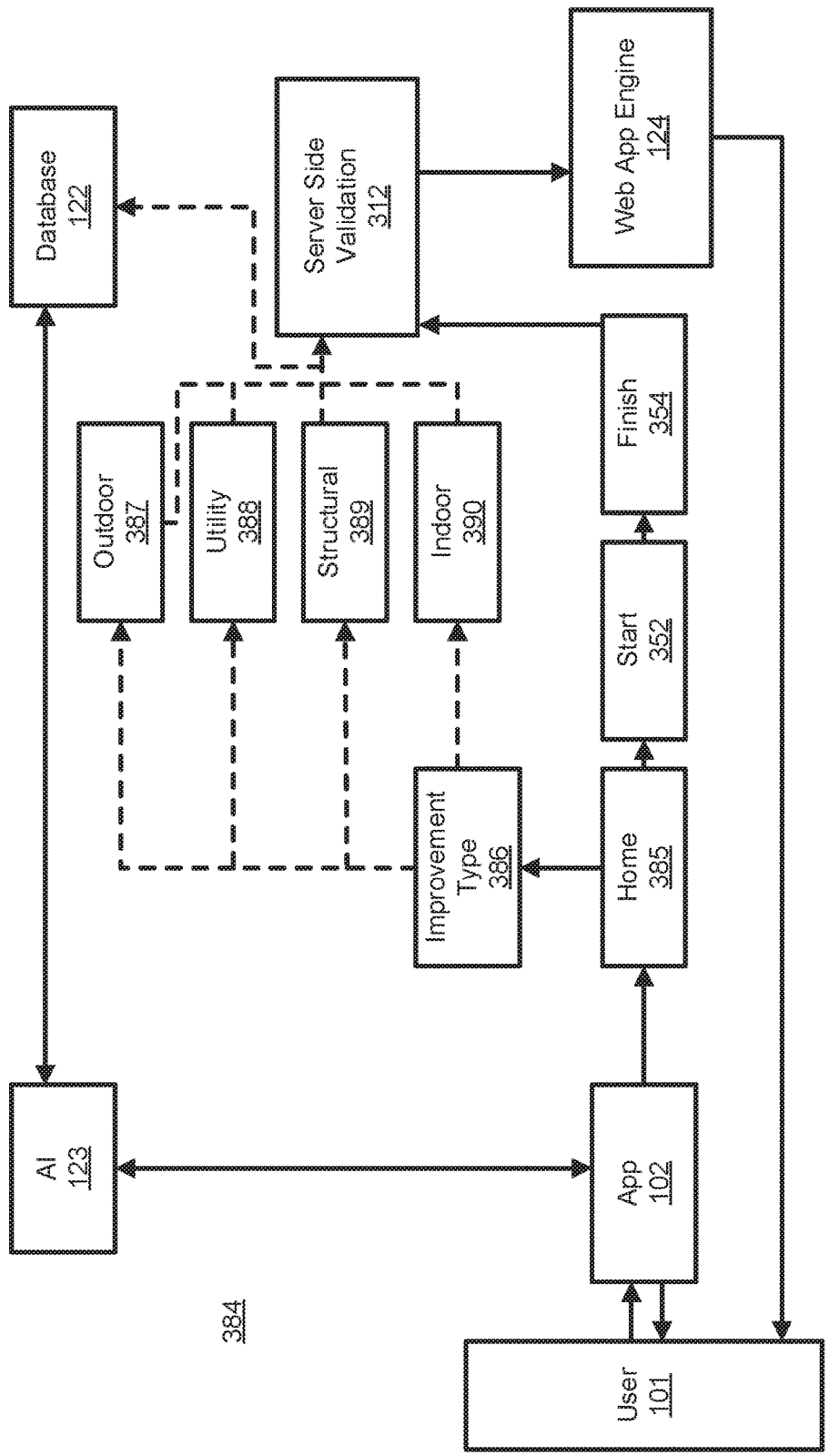
FIG. 3F illustrates a process for capturing data related to home improvement activities, in accordance with various embodiments.

Referring now to FIG. 3F, system 384 is shown for collecting and processing home improvement data 204 (of FIG. 2) for user 101 using app 102, in accordance with various embodiments. App 102 running on computing device 103 (of FIG. 1) may detect a home improvement event 385 in response to a user selecting home improvement in app 102, detecting a location of device 103 (of FIG. 2) at a home improvement vendor, detecting a contractor's presence at user's home, or otherwise determining that user 101 is making a home improvement. App 102 may categorize the improvement type 386 as outdoor 387, utility 388, structural 389, indoor 390, or other suitable home improvement categories. App 102 may categorize the home improvement event 385 in response to the user selecting a category, matching an image of the improvement to a known improvement type, receiving data from a vendor or third-party app, and/or prompting user 101 to confirm a category of home improvement event 385.

In various embodiments, app 102 may capture start 352 data such as, for example, start location, start time, start temperature, start biometrics, start environmental condition, starting utility consumption, starting energy efficiency or other start conditions measured or entered at the start of home improvement event 385. App 102 may also capture end 354 data such as, for example, end location, end time, end temperature, end biometrics, end environmental condition, ending utility consumption, ending energy efficiency or other end conditions measured or entered at the end of home improvement event 385. Start 352 data may be compared to end 354 data to detect a difference or change in conditions such as, for example, duration, location, energy consumption, or efficiency change of home improvement event 385.

In various embodiments, app 102 may transmit home improvement event 385, associated categories, and other associated data such as, for example, improvement performed, cost of improvement, energy consumption to make improvement, tools used, or energy efficiency change resulting from improvement to web server 120 (of FIG. 2), web app engine 124 (of FIG. 2), and/or database 122 for server-side validation 312 and for analysis by AI 123. AI 123 may consider real-time data from app 102 and data written to database 122 to make user experience improvements. Web app engine 124 may calculate $CO_2$ emissions associated with a user's home improvements, and web app engine 124 may assign credits to user 101 based on calculated $CO_2$ emissions.

Figure 3G:
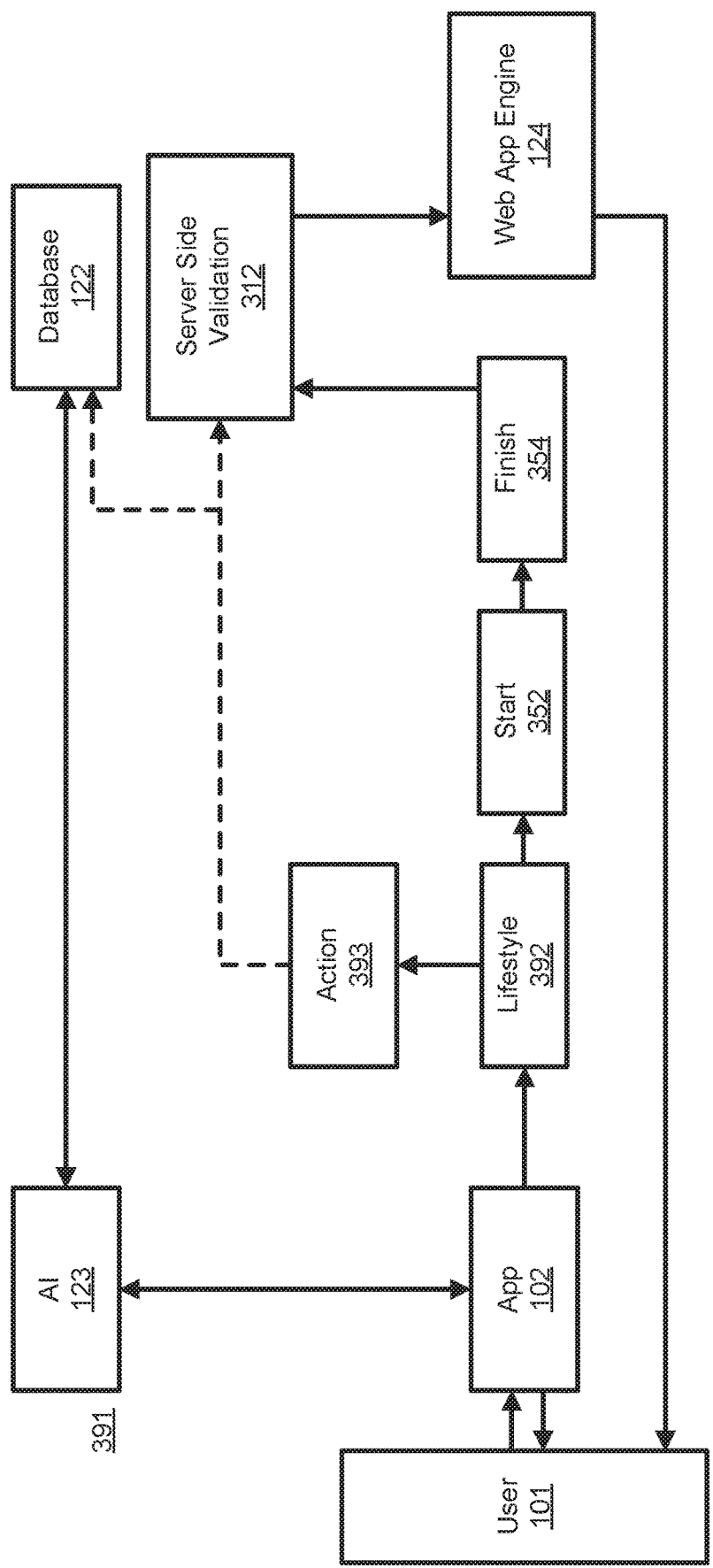
FIG. 3G illustrates a process for capturing data related to lifestyle activities, in accordance with various embodiments.

Referring now to FIG. 3G, system 391 is shown for collecting and processing lifestyle data 214 (of FIG. 2) for user 101 using app 102, in accordance with various embodiments. App 102 running on computing device 103 (of FIG. 1) may detect a lifestyle event 392 in response to a user selecting lifestyle, detecting the presence of mobile device 103 (of FIG. 1) at a relevant vendor or event, or otherwise detecting events relevant to the lifestyle of user 101. App 102 may categorize the action type 393 based on characteristics relevant to ecological impact of the actions of user 101. App 102 may categorize the lifestyle event 392 in response to the user selecting a category and/or prompting user 101 to confirm a category of lifestyle event 392.

In various embodiments, app 102 may capture start 352 data such as, for example, start location, start time, start temperature, start biometrics, start weight, start body measurement, start activity durations, starting medical conditions, or other start conditions measured or entered at the start of lifestyle event 392. App 102 may also capture end 354 data such as, for example, end location, end time, end temperature, end biometrics, end weight, end body measurement, end medical conditions, or other end conditions measured or entered at the end of lifestyle event 392. Start 352 data may be compared to end 354 data to detect a difference or change in conditions such as, for example, the cumulative environmental impact of repeating lifestyle events 392.

In various embodiments, app 102 may transmit lifestyle event 392, associated categories, and other associated data such as, for example, action performed, cumulative impact of action, or carbon impact associated with the action performed to web server 120 (of FIG. 2), web app engine 124 (of FIG. 2), and/or database 122 for server-side validation 312 and analysis by AI 123. AI 123 may consider real-time data from app 102 and data written to database 122 to make user experience improvements. Web app engine 124 may calculate $CO_2$ emissions associated with a user's lifestyle, and web app engine 124 may assign credits to user 101 based on calculated $CO_2$ emissions.

Figure 3H:
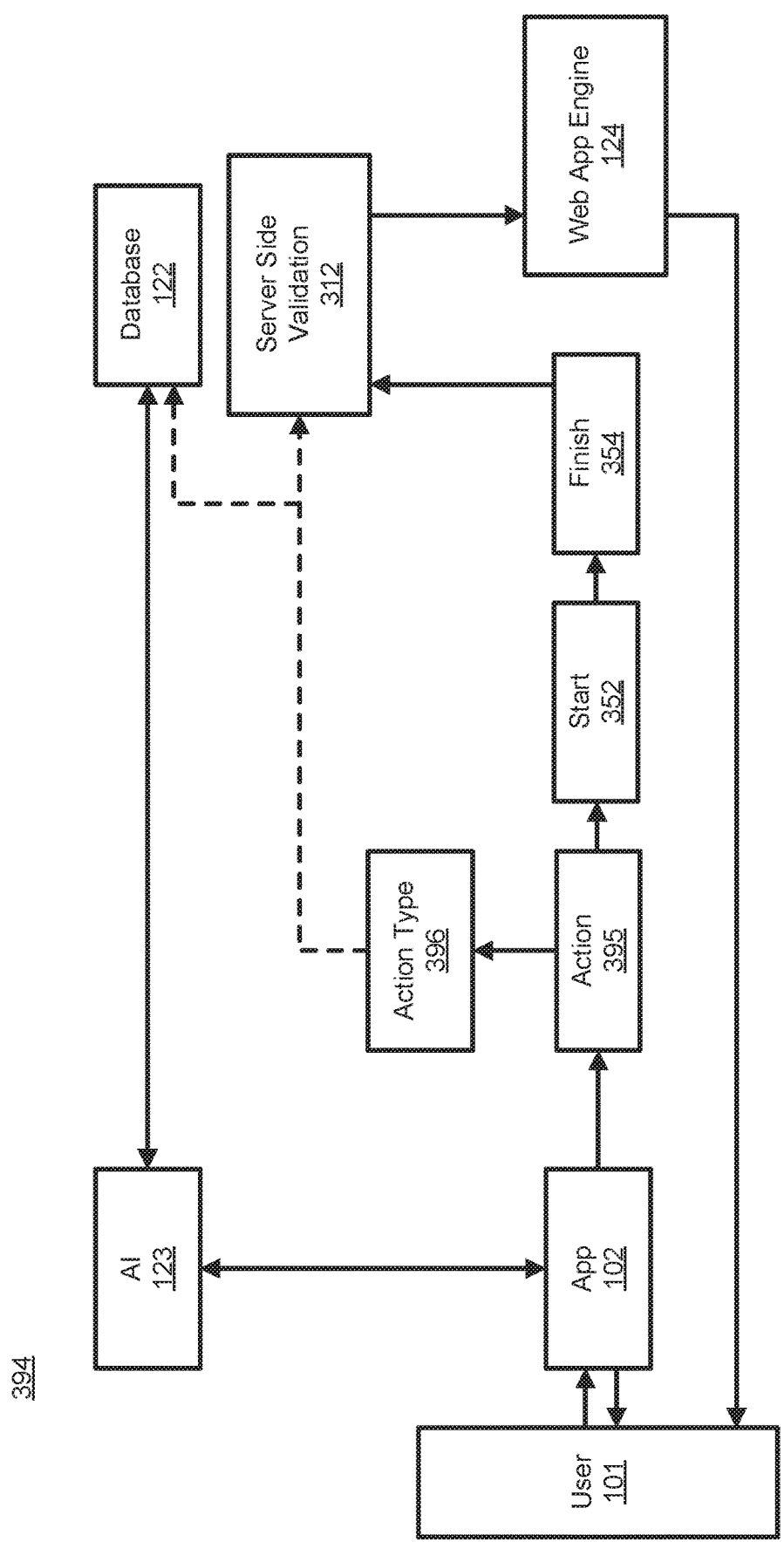
FIG. 3H illustrates a process for capturing data related to general activities, in accordance with various embodiments.

With reference to FIG. 3H, system 394 is shown for collecting and processing action data 210 (of FIG. 2) for user 101 using app 102, in accordance with various embodiments. App 102 running on computing device 103 (of FIG. 1) may detect an action event 395 in response to a user selecting action, detecting a purchase associated with an action, detecting mobile device 103 (of FIG. 1) in a location relevant to an action, or otherwise detecting data points relevant to actions of user 101. App 102 may categorize the action type 396 based on characteristics relevant to ecological impact of the actions of user 101. App 102 may categorize the action event 395 in response to the user selecting a category and/or prompting user 101 to confirm a category of action event 395. Action events may include, for example, repairs that improve efficiency, retrofits that improve energy efficiency, improvements that enhance efficiency, or other affirmative actions with a positive environmental impact.

In various embodiments, app 102 may capture start 352 data such as, for example, start location, start time, start temperature, start biometrics, starting energy efficiency, or other start conditions measured or entered at the start of action event 395. App 102 may also capture end 354 data such as, for example, end location, end time, end temperature, end biometrics, end energy efficiency or other end conditions measured or entered at the end of action event 395. Start 352 data may be compared to end 354 data to detect a difference or change in conditions such as, for example, the environmental impact of an action event 395 over a period.

In various embodiments, app 102 may transmit action event 395, associated categories, and other associated data such as, for example, action performed, cumulative impact of action, or carbon impact associated with the action performed to web server 120 (of FIG. 2), web app engine 124 (of FIG. 2), and/or database 122 for server-side validation 312 and analysis by AI 123. AI 123 may consider real-time data from app 102 and data written to database 122 to make user experience improvements. Web app engine 124 may calculate $CO_2$ emissions associated with a user's actions, and web app engine 124 may assign credits to user 101 based on calculated $CO_2$ emissions.

Figure 3I:
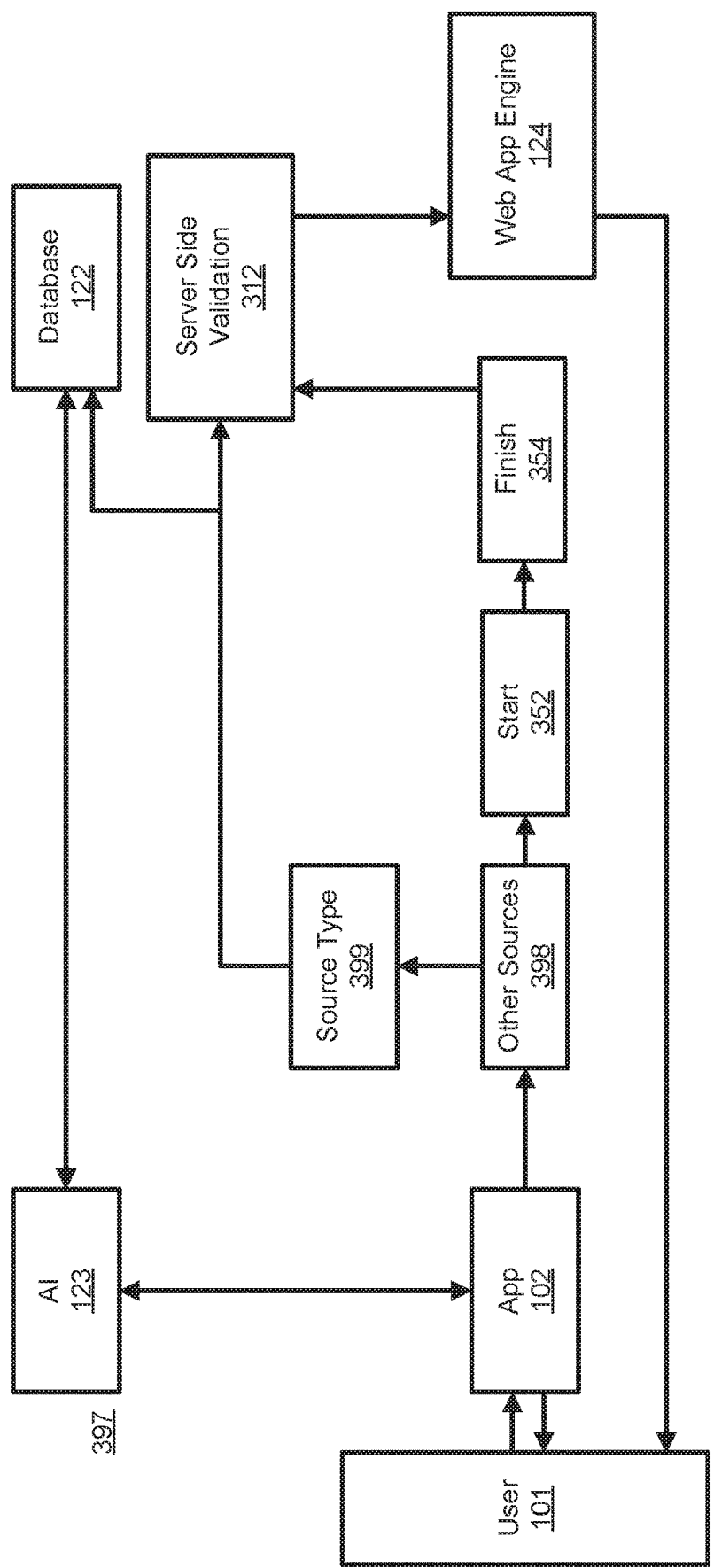
FIG. 3I illustrates a process for capturing data related to user activities from third-party data sources, in accordance with various embodiments.

Referring now to FIG. 3I, system 397 is shown for collecting and processing data from other sources 216 (of FIG. 2) for user 101 using app 102, in accordance with various embodiments. App 102 running on computing device 103 (of FIG. 1) may detect data from other sources 398 in response to app 102 reading a communication with a third-party app, detecting a measurement from an internet source, receiving a user's purchase transaction history, using an API call, using an operating system call, or detecting communication from other sources 398 with mobile device 103. App 102 may categorize the source type 399 based on characteristics relevant to ecological impact of the actions of user 101. For example, source type may be bank app, a food delivery app, a retail app, a fitness app, a meal tracking app, an Internet of Things (IoT) device, a subscription service, a charitable donation app, a social media platform, or other source for data relevant to ecological impact of user 101. App 102 may categorize the source type 399 in response to the user selecting a category and/or prompting user 101 to confirm a category of other sources 398.

In various embodiments, other sources 398 or app 102 may capture start 352 data such as, for example, start location, start time, start temperature, start biometrics, starting energy efficiency, or other start conditions measured or entered at the start of other source 398. Other source 398 or app 102 may also capture end 354 data such as, for example, end location, end time, end temperature, end biometrics, end energy efficiency or other end conditions measured or entered at the end of other source 398. Start 352 data may be compared to end 354 data to detect a difference or change in conditions such as, for example, the duration of other source 398.

In various embodiments, app 102 may transmit other data sources 398, associated categories, and other associated data such as, for example, data source type, data source name, authorization to interact with the data source, or carbon impact associated with the data received from other sources to web server 120 (of FIG. 2), web app engine 124 (of FIG. 2), and/or database 122 for server-side validation 312 and analysis by AI 123. AI 123 may consider real-time data from app 102 and data written to database 122 to make user experience improvements. Web app engine 124 may calculate $CO_2$ emissions associated with a user data from other data sources, and web app engine 124 may assign credits to user 101 based on calculated $CO_2$ emissions.

Figure 4:
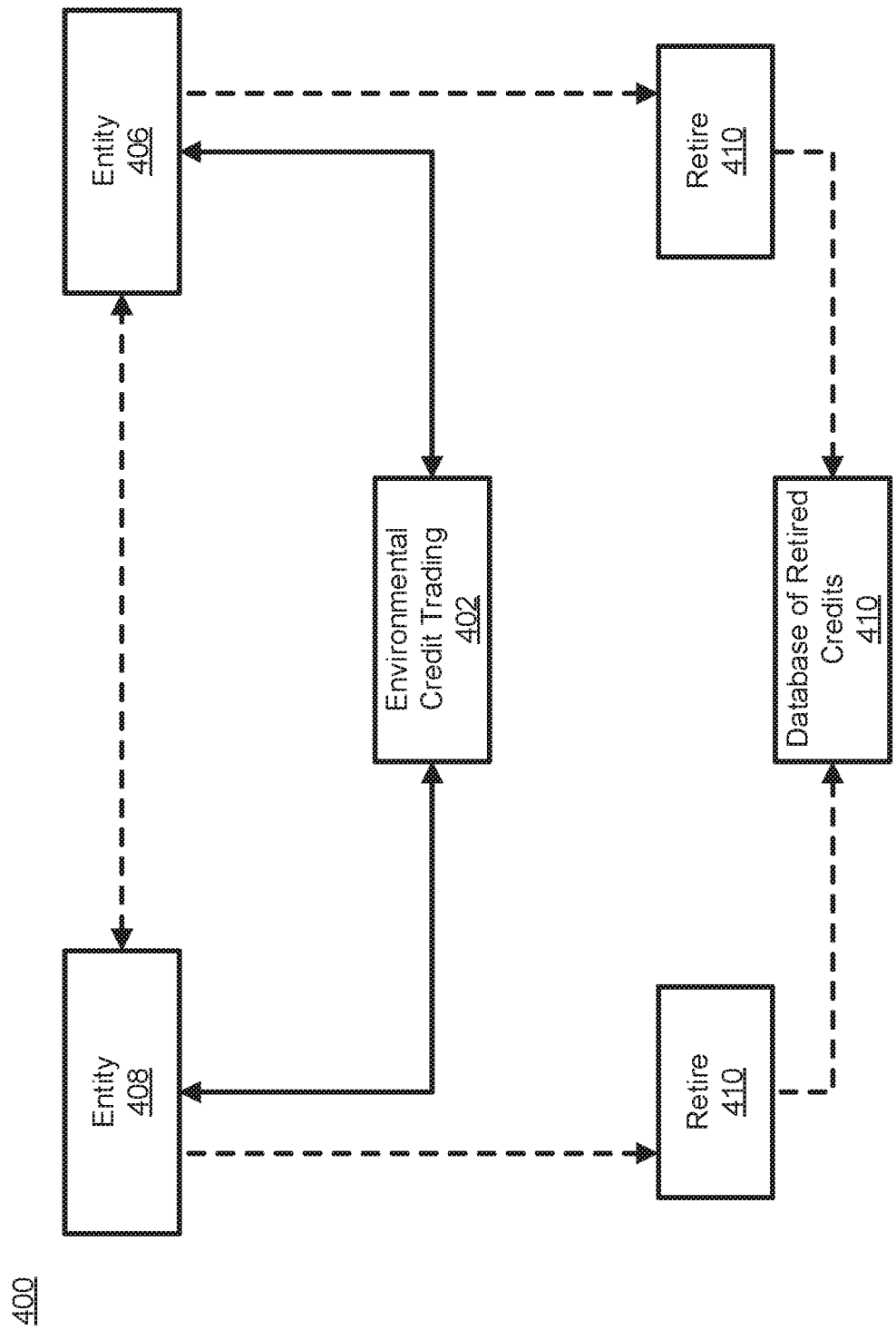
FIG. 4 illustrates a process for trading credits generated in response to the ecological impact of user activities, in accordance with various embodiments.

With reference to FIG. 4, a system 400 is shown for trading credits generated based on the ecological impact of individual behavior, in accordance with various embodiments. System 400 may comprise an environmental credit trading platform 402 running on one or more computing devices in communication with a first entity 406 in communication with credit trading platform 402 and a second entity in communication with credit trading platform 402. Each entity may run an app 102 (of FIG. 1) on a computing device 103 (of FIG. 1) in electronic communication with environmental credit trading platform 402.

In various embodiments, entity 408 and/or entity 406 may be a buyer or seller of carbon credits. One entity may sell their carbon credit to the other entity on trading platform 402. Trading platform 402 may facilitate the transfer of the carbon credit. Retire 410 occurs when entity 408 or entity 406 use credits to offset their carbon footprint. Entities may request retirement of the credits based on a unique serial number assigned to each credit. Retiring the credits used to offset carbon footprint may eliminate double counting of carbon credits. The carbon credit may not be used to offset carbon footprint or resold in response to being retired.

Figure 5:
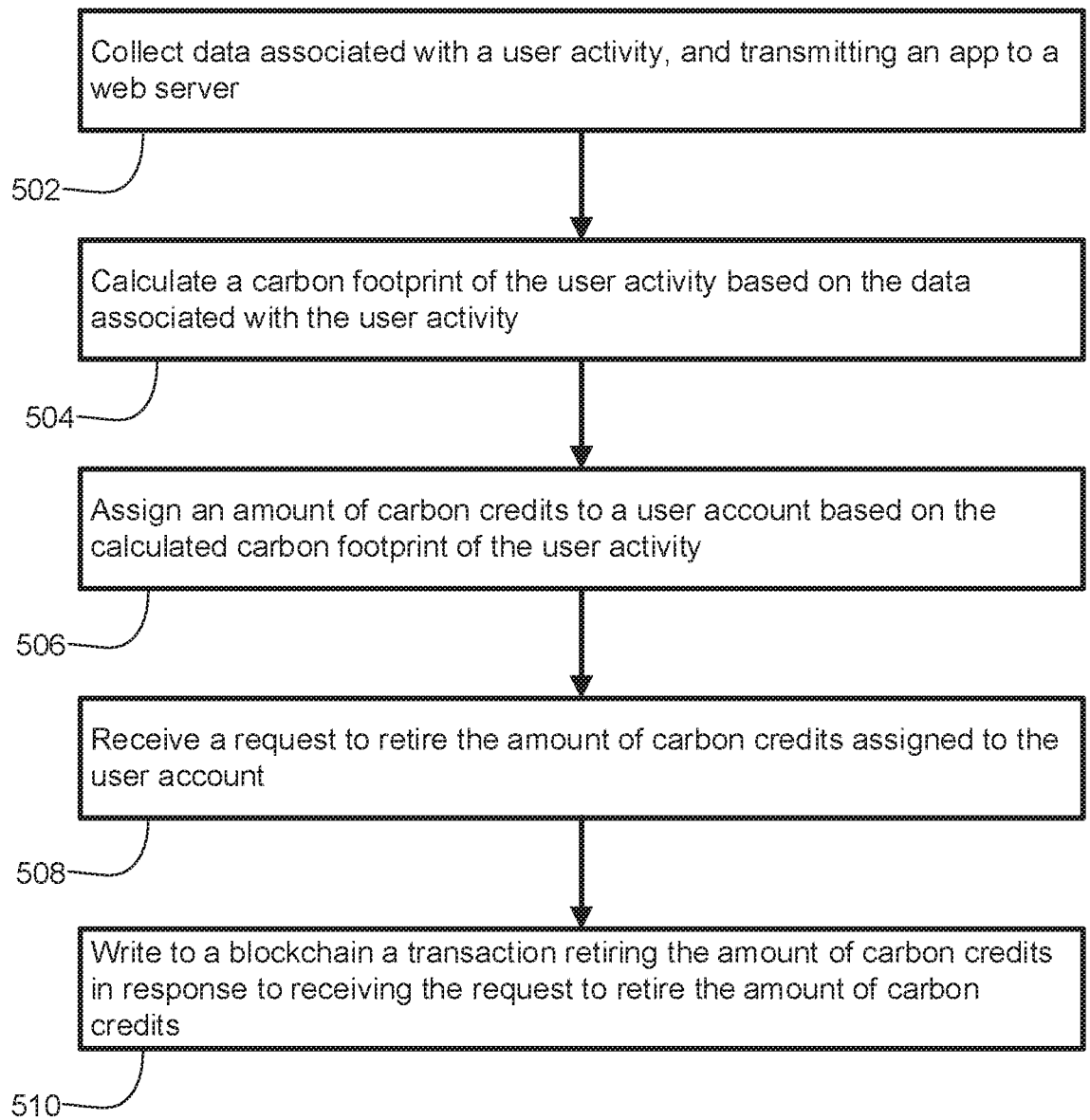
FIG. 5 illustrates a method for assigning and transferring credits based on ecological impact of user activities, in accordance with various embodiments.

Referring to FIG. 5, a method 500 for assigning and trading carbon credits using system 100 (of FIG. 1) is shown, in accordance with various embodiments. Method 500 may include collecting data associated with a user activity. System 100 may transmit data from an app 102 (of FIG. 1) running on a computing device 103 (of FIG. 1) with a user account logged into app 102 (Block 502). Method 500 may also include system 100 calculating a carbon footprint of the user activity based on the data associated with the user activity (Block 504). The calculation may occur on any computing device of system 100 in communication with app 102.

In various embodiments, method 500 may also include system 100 assigning an amount of carbon credits to the logged in user account based on the calculated carbon footprint of the user activity (Block 506). System 100 may receive a request to retire the amount of carbon credits assigned to the user account (Block 508). The request may be received from an entity offsetting its carbon footprint by retiring the credits. Method 500 may also include writing to the blockchain a transaction retiring the amount of carbon credits from the user account (Block 510). Data written to the blockchain may include credits owned by various entities. Credits may be tracked using the unique serial number assigned to each credit on formation. Entities may be represented by a unique identifier such as an account number or entity number, for example. In that regard, the blockchain may maintain a publicly available ledger of entities producing and offsetting carbon credits and the activities and events supporting generation of credits.

Systems of the present disclosure may use real-time analysis of an individual, action, event, products, groups, etc. to generate credits based on resultant $CO_2$ emissions saved over a baseline value, in various embodiments. Carbon credits may thus be generated using a live Carbon Calculator similar to system 100 of FIG. is that allows users to gather data dynamically to calculate total carbon emissions of a user and return the information and/or carbon credits to users in real-time. Systems of the present disclosure may thus gather user data to create a set analytics and credits to improve carbon emissions for users. Systems of the present disclosure may use Machine Learning algorithms trained based at least in part on gathered data user. In that regard, Systems of the present disclosure may improve behavior automatically over time as the data set and corresponding results set grows.

In various embodiments, credits earned and transacted may be securely recorded on a blockchain. In that regard, balances and transactions may be publicly available for review and confirmation by interested parties. Systems of the present disclosure may also integrate with third-party application related to shops, transportation companies, events, banks, websites, social media platforms, or other third party applications capable of capturing, collecting, identifying, processing, or verifying user data.

Systems of the present disclosure may educate and inform users about their $CO_2$ emissions, reduction methods of $CO_2$ emissions and other $CO_2$ emission possibilities whether in the present moment or future event in real time. Systems may engage daily, hourly, in-real time, or in any desired frequency with users 101 (of FIG. 1) to track, monitor, and educate themselves about $CO_2$ emissions and their impact to themselves, society and the well-being of the planet. $CO_2$ emissions and credit calculations may be transparent and publicly available through blockchain.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices, systems, and methods are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A method for execution by a computer-based system, comprising:
    collecting, by a mobile device, data associated with a user activity by detecting movement in response to a changing location of the mobile device, wherein the data is transmitted from the mobile device to a server for storage in association with a user account in response to the user account being logged into the mobile device and authenticated by the server;
    capturing, by the computer-based system, a start location and an end location associated with the user activity for inclusion in the data associated with the user activity;
    calculating, by the server, an emissions reduction of the user activity in real-time based on the data associated with the user activity,
        wherein the calculated emissions reduction is based on a distance traveled,
        wherein the distance traveled is determined based on the start location and the end location,
        wherein the emissions reduction is calculated by subtracting an estimated emission value of the user activity from a baseline emissions value,
        wherein the estimated emission value of the user activity is based on the distance traveled and a mode of transportation used during the user activity, and
        wherein the baseline emissions value is based on the distance traveled and a baseline mode of transportation;
    creating, by the server, an amount of carbon credits assigned to a user account authenticated with the server based on the calculated emissions reduction of the user activity,
        wherein the carbon credits are retireable to offset an emission amount of a third party in response to being retired by the third party, wherein the emission amount that is offset by retiring the amount of carbon credits is equal to the emission reduction of the user activity used to create the amount of carbon credits;

receiving, by the server, a request to retire the amount of carbon credits assigned to the user account; and writing, by the server and to a blockchain, a transaction retiring the amount of carbon credits in response to receiving the request.

2. The method of claim 1, further comprising writing, by the computer-based system and to the blockchain, a transaction transferring a second amount of carbon credits to a second user account authenticated with the computer-based system in response to receiving a purchase from the second user account.

3. The method of claim 2, further comprising writing, by the computer-based system and to the blockchain, a transaction retiring the carbon credits assigned to the user account in response to receiving a purchase from the second user account.

4. The method of claim 1, wherein the user activity comprises at least one of a transportation event, a home improvement event, a food event, a lifestyle event, or a retail event.

5. The method of claim 1, further comprising capturing, by the computer-based system, a vehicle model associated with the user activity.

6. The method of claim 1, further comprising:
capturing, by the computer-based system, a start time and an end time associated with the user activity for inclusion in the data associated with the user activity;
capturing, by the computer-based system, a vehicle model associated with the user activity; and
calculating, by the computer-based system, the emissions reduction of the user activity based on a travel duration determined based on the start time and the end time.

7. The method of claim 5, further comprising assigning, by the computer-based system, the amount of carbon credits to the user account authenticated with the computer-based system based on a function of the calculated emissions reduction and the baseline emissions value.

8. A computer-based system, comprising:
a processor; and
a tangible, non-transitory memory configured to communicate with the processor, the tangible, non-transitory memory having instructions stored thereon that, in response to execution by the processor, cause the computer-based system to perform operations comprising:
collecting data associated with a user activity by detecting movement in response to a changing location of a mobile device, wherein the data is transmitted from the mobile device to the processor for storage in association with a user account authenticated by the processor;
capturing, by the computer-based system, a start location and an end location associated with the user activity for inclusion in the data associated with the user activity;
calculating an emissions reduction of the user activity using the data associated with the user activity in real-time,
wherein the emissions reduction is calculated by subtracting an emission value of the user activity from a baseline emissions value,
wherein the emissions reduction is based on a distance traveled,
wherein the distance traveled is determined based on the start location and the end location,
wherein the emission value of the user activity is based on the distance traveled and a mode of transportation used during the user activity, and
wherein the baseline emissions value is based on the distance traveled and a baseline mode of transportation;
creating an amount of carbon credits assigned to a user account authenticated with the computer-based system based on the calculated emissions reduction of the user activity; and
receiving a request to retire the amount of carbon credits assigned to the user account; and
writing to a blockchain a transaction retiring the amount of carbon credits in response to receiving the request.

9. The computer-based system of claim 8, wherein the operations further comprise writing, to the blockchain, a transaction transferring a second amount of carbon credits to a second user account authenticated with the computer-based system in response to receiving a purchase from the second user account.

10. The computer-based system of claim 9, wherein the operations further comprise writing, to the blockchain, a transaction retiring the carbon credits assigned to the user account in response to receiving a purchase from the second user account.

11. The computer-based system of claim 8, wherein the user activity comprises at least one of a transportation event, a home improvement event, a food event, a lifestyle event, or a retail event.

12. The computer-based system of claim 8, wherein the operations further comprise capturing, by the computer-based system, a vehicle model associated with the user activity.

13. The computer-based system of claim 12, wherein the operations further comprise assigning the amount of carbon credits to the user account authenticated with the computer-based system based on a function of the calculated emissions reduction and a baseline value.

14. The computer-based system of claim 12, wherein the operations further comprise:
capturing, by the computer-based system, a start time and an end time associated with the user activity for inclusion in the data associated with the user activity;
capturing, by the computer-based system, a vehicle model associated with the user activity; and
calculating, by the computer-based system, the emissions reduction of the user activity based on a travel duration determined based on the start time and the end time.

15. An article of manufacture including a non-transitory, tangible computer readable storage medium having instructions stored thereon that, in response to execution by a computer-based system, cause the computer-based system to perform operations comprising:
collecting data associated with a user activity by detecting movement in response to a changing location of a mobile device, wherein the data is transmitted from the mobile device to a server for storage in association with a user account authenticated by the server;
capturing, by the computer-based system, a start location and an end location associated with the user activity for inclusion in the data associated with the user activity;
calculating an emissions reduction of the user activity in real-time based on the data associated with the user activity,
wherein the calculated emissions reduction is based on a distance traveled, wherein the distance traveled is determined based on the start location and the end location, wherein the emissions reduction is calculated by comparing an emission value of the user activity to a baseline emissions value;

creating an amount of carbon credits assigned to the user account authenticated with the server based on the calculated emissions reduction of the user activity, wherein the carbon credits are retireable to offset an emission amount of a third party in response to being retired by the third party, wherein the emission amount that is offset by retiring the amount of carbon credits is equal to the emission reduction of the user activity used to create the amount of carbon credits; and receiving a request to retire the amount of carbon credits assigned to the user account; and writing to a blockchain a transaction retiring the amount of carbon credits in response to receiving the request.

16. The article of claim 15, wherein the operations further comprise writing, to the blockchain, a transaction transferring a second amount of carbon credits to a second user account authenticated with the computer-based system in response to receiving a purchase from the second user account.

17. The article of claim 16, wherein the operations further comprise writing, to the blockchain, a transaction retiring the carbon credits assigned to the user account in response to receiving a purchase from the second user account.

18. The article of claim 15, wherein the user activity comprises at least one of a transportation event, a home improvement event, a food event, a lifestyle event, or a retail event.

19. The article of claim 15, wherein the operations further comprise capturing, by the computer-based system, a vehicle model associated with the user activity.

20. The article of claim 19, wherein the operations further comprise assigning the amount of carbon credits to the user account authenticated with the server based on a function of the calculated emissions reduction and a baseline value.

* * * * *